United States Patent [19]
Hvolka

[11] Patent Number: 5,141,384
[45] Date of Patent: Aug. 25, 1992

[54] MULTI-PURPOSE ARTICULATED DRAG ARM DIGGING AND HAULING VEHICLE

[76] Inventor: Dusan J. Hvolka, 419 Wakara Way, Suite 209, Salt Lake City, Utah 84108

[21] Appl. No.: 577,154

[22] Filed: Sep. 4, 1990

Related U.S. Application Data

[63] Continuation-in-part of Ser. No. 359,278, May 31, 1989, abandoned, which is a continuation-in-part of Ser. No. 140,671, Jan. 4, 1988, abandoned.

[51] Int. Cl.⁵ ............................................. B60D 1/04
[52] U.S. Cl. .................................... 414/493; 414/525.1; 180/65.5; 180/134; 37/4; 37/118 A; 37/DIG. 1; 37/DIG. 2; 37/DIG. 14; 37/DIG. 15; 37/DIG. 20
[58] Field of Search ............... 414/419, 420, 459, 460, 414/469, 472, 485, 487, 491, 492, 493, 501, 521, 551, 554, 565, 566, 749, 916, 525.1; 180/11, 89.1, 234, 235, 311, 312, 317, 904, 134; 37/118 A, 118 R, 124, 126 A, 126 R, 126 AA, 126 AB, 126 AC, 126 AD, 126 AE, DIG. 5, DIG. 15, DIG. 18; 901/47

[56] References Cited

U.S. PATENT DOCUMENTS

| | | | |
|---|---|---|---|
| 1,891,266 | 12/1932 | Le Tourneau | 37/126 AD |
| 2,654,165 | 10/1953 | Lichtenberg | 37/126 AD |
| 2,679,119 | 5/1954 | Robb | 37/DIG. 5 X |
| 2,795,872 | 6/1957 | Wardle | 414/492 X |
| 3,030,715 | 4/1962 | Bodine | 414/722 X |
| 3,235,983 | 2/1966 | Wilson | 414/493 X |
| 3,520,432 | 7/1970 | Muotka et al. | 414/487 |
| 3,628,265 | 12/1971 | Galis | 37/126 A |
| 3,826,387 | 7/1974 | Galis | 414/551 |
| 3,877,717 | 4/1975 | Swoager | 280/666 |
| 3,914,065 | 10/1975 | Domenighetti | 280/400 X |
| 3,937,345 | 2/1976 | Countrman | 414/492 |
| 4,249,629 | 2/1981 | Hutt | 280/400 X |
| 4,505,632 | 3/1985 | Quenzi | 414/551 X |
| 4,652,204 | 3/1987 | Arnett | 901/47 X |

FOREIGN PATENT DOCUMENTS

| | | | |
|---|---|---|---|
| 0125952 | 6/1987 | Japan | 180/234 |
| 1059656 | 2/1967 | United Kingdom | 414/565 |

Primary Examiner—David A. Bucci
Assistant Examiner—James Keenan
Attorney, Agent, or Firm—Marcus G. Theodore

[57] ABSTRACT

An articulated U-shaped multi-purpose vehicle particularly adapted for underground digging and hauling comprising: a digging component having a U-shaped frame having opposing sides and front ends connected by a front piece, and rear ends defining an open interior space in communication with an open front end; wheel mounts capable of pivoting attached to the opposing sides; a plurality of wheels independently suspended and rotatably attached to the wheel mounts; pivots associated with the wheel mounts to pivot and turn each wheel in a desired direction; a digging bucket and drag arm hingedly attached to the front of the frame, and a hingedly attached independent drive component with an engine and wheels to move the wheels forward and backward; and power controls mounted to the frame to selectively activate the digging and drive components to dig and haul rock, ore, and the like.

15 Claims, 4 Drawing Sheets

MULTI-PURPOSE ARTICULATED DRAG ARM DIGGING AND HAULING VEHICLE

RELATED APPLICATIONS

This application is a continuation-in-part application of the continuation-in-part application entitled Multi-Purpose Digging and Hauling Vehicle, Ser. No. 359,278, filed May 31, 1989 of the originally filed application: U.S. patent application, Ser. No. 07/140,671, filed Jan. 4, 1988 entitled "Multi-Purpose Vehicle", both now abandoned.

BACKGROUND OF THE INVENTION

Field

This invention relates to multi-purpose vehicles. Specifically, it relates to an improved light weight, highly efficient multi-purpose vehicle particularly adapted for underground digging and hauling applications.

State of the Art

Numerous multi-purpose vehicles are known. These vehicles typically employ an X-shaped, or box-shaped frame with a conventional cab on the front, and a cabin or bed attached along the length of the frame, such as the amphibious vehicle designed by Fletcher et al, U.S. Pat. No. 2,923,268. Generally, the conventional multi-purpose vehicle has forward steering wheels and rear drive wheels. When pulling heavy objects, a number of conventional vehicles may be harnessed together in series. This requires a long pulling space to accommodate the aligned vehicles connected in series. These harnessed vehicles are also difficult to turn and cause the rear vehicles to run in the tracks left by the forward vehicles; often times resulting in poor traction of the trailing vehicles. The aligned vehicles, when harnessed, generally move in a longitudinal direction. Non-pivoting wheels of conventional vehicles do not allow significant sideward movement, which makes it necessary to uncouple and recouple the vehicles where it is necessary to move the load laterally.

To shorten the turning radius of conventional vehicles, articulated vehicles, such as those described in Hutt, U.S. Pat. No. 4,249,629, and Domenighetti, U.S. Pat. No. 3,914,065 have been utilized. In other applications, a series of carts pulled by a main drive vehicle may be employed, such as the Fire Fighting and Rescue Apparatus described by P. F. Cummins, U.S. Pat. No. 3,169,581.

The confined working space in underground mines also requires compactness in self loading hauler (SLH) vehicle designs. As a result, SLH vehicles tend to have a length slightly greater than a light hauling design vehicle, with a length greater than the combined width and height of the vehicle. The excessive length is tolerable in a majority of underground operations since the drifts (tunnels) are long in comparison and have a narrow width and low height. The excessive length of the SLH contributes to counter-balancing the oversized payloads. However, the narrow width complicates turning and side slope stability. This requires judicious design of the basic frame structure and the location of the components within it. Low height is not only desirable from an operating stand-point, but is also necessary in order to improve the stability of the SLH.

Applicant's invention described below provides an efficient ergonomically designed SLH vehicle with a centrally located operator station. It has independent wheel drive and suspension which can move laterally, if desired, for greater mobility. British Patent 1,203,338 incorporates a conveyor assembly running the length of the bed. It therefore is of a box-like shape rather than a U-shaped vehicle which can nest or interconnect for pulling and pushing articles. British Pat. No. 1,059,656 uses a flexible articulated frame shown in FIG. 5, which lifts and bends during lifting to scoop earth. British Patent No. 1,059,656 also incorporates a conveyor system into its bed for materials handling and movement.

Moehr, U.S. Pat. No. 3,306,478 is another example of a low profile, self-loading hauling and dumping vehicle. Kress, U.S. Pat. No. 4,026,430 is a mobile carrier for large scrap steel carrying boxes. Wardle, U.S. Pat. No. 2,795,872 is a carry-all with claw loading scraper apron to assist in loading. Quenzi, U.S. Pat. No. 4,505,638 is another example of a box frame, utilizing a horizontal pair of tracks along which its bucket travels. This loading movement of the bucket action differs from applicant's as described below. Wilson, U.S. Pat. No. 3,235,983 is another earth moving apparatus. Galis, U.S. Pat. No. 3,826,387 is a self loading and self-propelled haulage vehicle. Niva, U.S. Pat. No. 4,556,356 is a U-frame truck for handling and transportation of containers or receptacles. Robb, U.S. Pat. No. 2,679,119 discloses an auxillary scraper and loading apron. Bodine, U.S. Pat. No. 3,030,715 discloses a sonic wave earth digging and moving machine. Trieschmann, U.S. Pat. No. 3,273,732 is a self-loading vehicle and dump gate therefore. Le Tourneau, U.S. Pat. No. 1,891,266 discloses a scraper. Lichtenberg, U.S. Pat. No. 2,654,165 discloses a carry-type scraper with front digger moving means. Countryman, U.S. Pat. No. 3,937,345 is a shovel loader with ejector bucket. Shackley, Canadian Patent No. 681,266 is a vehicle provided with a dragline loader. Cited for general interest is Cohen, U.S. Pat. No. 4,065,825, and Nishibori, Japan No. 62-125952 showing an all wheel independent steering gear.

SUMMARY OF THE INVENTION

Applicant's invention comprises an articulated three component multi-purpose vehicle for digging, hauling, and the like. It has a uni-body U-shaped digging system component having a uni-body U-shaped digging frame with front, back, and opposing sides. An open top bucket load chamber is titably mounted to the frame. The bucket load chamber has opposing sides attached to a bed, with rear side ends connected by a back piece, and front ends defining an opening leading into an interior load carrying space of the chamber. Wheel mounts are attached to the opposing sides, and a plurality of wheels are then independently suspended and rotatably attached to the wheel mounts.

A bucket loader having a bottom and sides defining an open top scoop with open ends in communication with the bucket load chamber is attached to the frame. The lip of the bottom is sharpened to dig and scoop earth, ore, and the like, into said bucket loader.

Transfer means, i.e. a drag arm system, to transfer the contents of the bucket loader into the bucket load chamber are included. The preferred drag arm system has mounts having first and second ends slideably mounted within longitudinal top grooves along the top sides of the load chamber. Hydraulic pistons are then associated with the mounts to selectively move said mounts forward and rearward along the top grooves. At least one drag arm with attachment means are attached to the mounts to pivot as a lever. The other end is structured as a hooked drag when downwardly pivoted to drag earth or the like. A second pair of hydraulic pistons has one end attached to the mounts, and the other end attached to the drag arm attachment means to pivot the drag arms upward and downward in response to the extension and contraction of the second hydraulic pistons.

Control means are included to selectively pivot, extend and rearwardly pull the drag arms to drag ore, rocks, and the like from the bucket loader into the bucket load chamber.

Dumping means, i.e. a dump cylinder, are operably associated with the frame and bucket load chamber to selectively lift and tilt the bottom of the bucket load chamber to unload the contents of said chamber through the open end of the bucket loader in one mode, and to lower and ready the bucket load chamber for receipt of materials in the other mode.

A three point hinge connecting articulation system component having a first joint is attached to the back of the digging frame.

A drive system component having a frame with front, back, and sides having a second joint is then hingedly attached to the first joint. The drive system preferably has a cab mounted near the front of the frame, sized to accommodate an operator. Secondary power means, such as a generator or battery, are operably associated with the control panel and dumping and transfer means to enable the operator to selectively load and unload the bucket loader.

The drive system has independent drive means associated with each wheel to rotate said wheels forward and backward. A power source, such as an internal combustion engine, is included to operate the pivot means and independent drive means.

Control means, such as a control panel, are mounted to the frame and associated with the drive means, and pivot means to selectively activate the drive means and pivot means to align and drive each wheel at the desired speed and direction.

Various types of conventional pivot means may be attached to the wheel mounts to allow each pivot to independently turn in a desired direction for independent steering. Preferably, each wheel also has an independent drive motor associated with it to rotate said wheel in a forward or rearward direction, giving the vehicle wide directional steering latitude. Control means mounted to the frame are associated with the drive means and pivot means to selectively activate them to align and drive each wheel and the vehicle at the desired speed and direction.

Preferably the drive motors are preset to run at their optimal efficiency points. A variable speed transmission, such as that described in U.S. Pat. No. 4,856,378, entitled "Variable Speed Transmission", may then be included in the drive train to provide the desired speed and torque to each wheel.

For use in underground hauling, the bucket loader sides define a narrowing opening from front to back to concentrate materials scooped up by the front end of the bucket loader for discharge through its open rear end. Oscillation means may then be included to provide low frequency oscillations to the bucket loader to assist the bucket loader in digging and scooping material. Preferred oscillation means comprise simultaneously moving forward the edge of a bucket system having a bottom with a digging edge and sides by the thrust of a loader to penetrate a muckpile and partially fill the bucket with bulk material, while simultaneously oscillating the bottom of the bucket up and down to reduce the internal angle of friction of the muckpile to ease the pile penetration and loading. This method minimizes the resistance of the bulk material as it moves along the bucket and the walls of the bucket system, and may be employed with either an open ended or closed ended bucket. For self loading haulers, the bucket system is open ended to channel scooped materials rearward through the open rear end of the bucket into a carrying bed.

To assist in the transport of material along the bucket and walls, the method may include in addition conveying the material deposited in the bottom of the bucket rearward through the open rear end into a carrying bed via conveyor means such as a moving bed. In the preferred embodiment, the loading arm is used to drag material deposited in the bottom of the bucket rearward into the carrying bed.

Where the sidewalls provide excessive resistance to incoming materials entering the bucket, the method may also include transporting material in contact with the sidewalls of the bucket rearward through the open end into a carrying bed via transport means such as a rotating bar and chain gripping system running along either or both sides of the sidewalls of the bucket. An example of a transport system is that incorporated in the WAV ® 300 excavation system for excavating stone drift in hard coal mines produced by Westfalia Lunen.

The preferred bucket system has an open front scoop with a sloped bottom structured such that the front blade edge of the scoop is wider than the rear edge of the scoop. The bottom has vertical sloping sidewalls attached to channel material received from the front to the scoop through the rear of the scoop into a carrying bed. The weight of the material and its friction forces on the bucket lip and walls act against the movement of the material. The rock in the pile includes course particle material of various sizes. The required effort exerted by the loading head (bucket) is determined by the depth of penetration, the length of the blade (width of the bucket) and the slope of the penetrating plane of the blade.

The SLH loading head blade edge acts like a wedge when penetrating a rock pile. The force resisting this wedging action is usually greater than the other frictional forces and is difficult to estimate. As a wedge penetrates loose rock, the rock in the vicinity of the wedge is compacted, exerting pressure on the wedge faces. As a first approximation, the normal pressure on the wedge face is assumed to be a linear function of depth of penetration. The resistance to penetration—a combination of the axial components of the normal and frictional forces—is then proportional to the square of the penetration depth. Besides compaction, shear forces are generated in the medium. When the shear forces along a certain surface within the rock medium exceed the frictional resistance, a part of the rock medium will move relative to the bulk of the rock along that surface, assuming that the loose rock is cohesionless, and the resistance to relative motion between rock particles is due to friction. The resistance to penetration will be reduced, especially if the sheared portion is removed and the penetration cycle will start all over from the newly exposed surface.

If the rock medium is confined on both sides, and the boundaries of the shear source and compaction region do not reach the free surface, then the rock within the region of compaction will experience greater compaction than in the semi-infinite case. The resistance to wedge penetration will also be greater. In other words, for the same penetration force, the depth of penetration will be less than when the rock is unconfined.

For two parallel wedges, such as the side edges of a digging bucket, the compaction of the rock between the wedges provides the most significant factor in resistance to penetration. Each wedge not only compacts the rock within its own area of influence, but also acts as a confinement relative to the other wedge. If the two compaction regions overlap, the compaction is increased, so is the resistance to penetration. If the potential shear surfaces overlap, then shearing will be prevented. There will be no relief from displacement of the sheared rock volume. All of these factors contribute to the increase in penetration resistance.

To reduce resistance to wedge penetration for improved digging and loading head bucket design, the above analysis shows that resistance to wedge penetration is mainly due to compaction of loose rock. This resistance is especially pronounced when there are two parallel wedges close to each other. In order to increase loading head penetration, the wedge angle of the bucket sidewalls is decreased from parallel to form a tapered shaped bucket having a wide opening gradually narrowed by the sidewalls forming a channel to concentrate materials as they travel rearward. The throat width of the bucket sidewalls is also selected to insure that the sidewalls do not provide compaction resistance to penetration within the tapering section of the loading head. Preferably, the loading head is enclosed on three sides—the bottom and two side walls—while the rock pile surface on top is free.

To further reduce confinement and compaction of the material scooped by the loading head, the sidewalls can be designed to slant upwards and outwards instead of being vertical. This allows the rock to move upwards, reducing the compaction and resistance to penetration by providing an opportunity for the rock to move in a direction other than towards one another. This takes advantage of the loading head's free top surface.

The primary factor of applicant's method to increase bucket load penetration is to loosen the rock inside the bucket through oscillation. As the bucket is oscillated up and down, the rock is also given an up and down motion. Since the amount of vertical displacement is different along the longitudinal axis, there is relative motion between the rock particles. This loosens up the rock, and reduces the compaction caused by the wedging action of the bucket sides.

The oscillating motion of the bucket also tends to break up any arching formed by the bridging of a few large particles near the throat. The result is a significant reduction in the resistance to bucket penetration. Furthermore, loosened rock has a smaller internal angle of friction (angle of repose). For a given rock pile height, the loose rock will extend farther into the loading head.

This method is similar to increasing the slump (low to high) of a concrete mix by addition of water to promote the relative movement between aggregate particles. Applicant's automated bucket system method accomplishes the same objectives in a dry muckpile.

The effect of loosening a rock pile through oscillation of the bucket (loading head) was confirmed through extensive field tests which showed the depth of penetration and the volume of rock contained within the loading head greatly increased. Because of the increased bucket digging efficiency, the size of the power train required to provide tractive effort is significantly less. As a result, the entire power train energy balance is more efficient, requiring much smaller engines to power digging vehicles such as self hauling vehicles.

The oscillating bucket loading head is particularly adapted for use with the loading bed of a self loading hauler. As the bucket loader penetrates the pile, materials are pushed rearward into the bottom of the bucket for discharge through the open rear discharge end of the bucket loader. Most large bucket loaders have a dead zone in the bed of the bucket loader just beyond the penetration point the digging edge enters a muckpile wherein the materials are not pushed rearward by incoming material. To further minimize resistance to penetration, means to continually remove rock deposited within this dead zone inside the bucket may be included. One example to assist in the rearward transport of materials out of this dead zone, includes a conveyor belt system to rearwardly transport materials onto the transport truck bed or conveyor belt. The segment of the sides of the bucket loader near this dead zone may also include circular drag arms to assist in the rearward transport of materials out of the bucket loader.

In the preferred embodiment, the loading arm sweeps through the volume of rock contained inside the dead zone of the bucket and drags it into the load chamber of a truck body or conveyor belt. This loading arm is used cyclically. Depending on the depth of penetration and the amount of rock within the bucket, the loading arm can make one or several short sweeping strokes before pushing the gathered rock all the way out of the bucket loading head into the truck body or conveyor. Removal of the loaded rock from the tapering section of the loading head also eliminates compaction. It also reduces penetration resistance arising from the weight of the rock held inside the bucket. Further, the force of the loading arm acting on the rock pile produces a reaction force which adds to the tractive effort, thus further increasing penetration into the rock pile.

In one preferred embodiment, the sides of the bucket loader are spaced sufficiently apart to minimize compaction resistance to materials scooped into the bucket loader. The bottom of the sides of the bucket loader are pivotally attached to the frame of a truck bed or conveyor belt such that the rear discharge end is in communication with carrying bed or conveyor belt. The bucket loader is pivotally attached to enable the operator to initially set the optimal digging angle of the digging edge, given the uneven floor of the gullies.

Tractive means, such as a drive truck or tractor, are associated with the bucket loader to provide forward movement to the digging edge to penetrate a pile. Hydraulic means, such as an hydraulic piston or rocker system, are associated with the bucket loader to provide low frequency upward and downward oscillations of the bucket loader; and are simultaneously activated with the tractive means to assist the bucket loader penetrate the pile. The size of the upward and downward oscillations varies depending upon the relative densities of the materials. For example, the hydraulic system is generally designed to provide and up to a plus or minus three inch vertical displacement of the digging edge of the bucket as it pivots. The frequency of the bucket oscillations is designed to generate from $\frac{1}{2}$ to up to 5 cycles per second. In the field, the operator may manually adjust the frequency and amplitude of the bucket as well as its forward thrust to overcome the resistance of the materials. Alternatively, an automated self adjusting control system utilizing various mechanical, electrical, and hydraulic means may be built into the hydraulic system to automatically increase the frequency and amplitude of the bucket oscillations and the forward movement of the digging edge to provide the desired penetration.

Applicant's multi-purpose articulated drag arm digging vehicle apparatus described above provides a highly efficient digging system resulting in optimization of vehicle digging forces which include lighter weight vehicles, increased travel speed, acceleration, and tractive forces from smaller engines and vehicles. Significant improvements in the horsepower to empty vehicle weight ratios for digging conditions and horsepower to gross vehicle width ratios for tramming conditions therefore result.

To dump the bucket loading chamber, the dump cylinders are activated. In the first mode, the dumping means selectively lift and vertically tilt the bottom of the bucket load chamber to unload said chamber through the open end of the bucket loader. After emptying, the dumping means then lower the bucket load chamber for receipt of materials in the second mode. The bucket functions as an open tailgate when in the first mode. The bucket is then selectively lowered so that additional material may be carried in the bucket after the bucket load chamber is filled for hauling in the second mode. Towards the rear of the U-frame, a cab is mounted to position the operator in view of the gully cleaning operations. The cab is sized to accommodate the operator, and includes at least one door opening for the operator to enter and exit the cab.

The wheel mounts and pivots allow the wheels to pivot and turn up to 25 degrees in a desired direction. A plurality of wheels are then independently suspended and rotatably attached to the wheel mounts via conventional mounts. The engine is operably associated with the wheels via a conventional transmission drive train to rotate the wheels forward or backward. The control panel controls not only the transmission output from the drive means to control the speed of the wheels, but also controls the pivot means to selectively align each wheel in the desired direction. In addition, the auxillary power sources, such as a hydraulic system, are also controlled by the control panel to selectively operate the tilting means, and bucket loader.

The type of transfer means required to empty the bucket loader into the bucket load chamber is dependent upon the type of material typically encountered. The above embodiment utilizing drag arms is preferred where large rocks and granular material are to be loaded. Preferably it includes at least one drag arm to assist in emptying the bucket loader by dragging the large objects from the bucket loader into the bucket load chamber. These drag arms avoid the problems encountered with the lift transfer means which could drop rocks, causing damage to the bed, or allow them to bounce out, endangering the operator. In one preferred embodiment, a wide drag arm with fingers runs the width of the bucket load chamber opening. The drag arm is pivotally associated with a pair of slides having first and second ends. The slides run along longitudinal parallel top grooves in the exterior sides of the bucket load chamber. A pair of hydraulic pistons each with one end secured to the first ends of slides and the other end secured to the rear top of the sides of the bucket load chamber selectively move said slides forward and rearward along the top grooves. The sides of the drag arm have rockers with one end bent as an L-shape and the other end including attachment means. The drag arm is pivotally mounted to the slides near the bend of the L to pivot upward and downward as the rockers are activated.

In operation, the drag arm pivots up and down and is extended to cover the length of the bucket loader. To pull material, the arms and fingers are extended in the most forward position, and pivoted downward for the fingers to hook on and grab large boulders, or rocks. The drag arm is then forced rearward via the loading hydraulic pistons discussed below, dragging the boulders or rocks from the bucket loader into the bucket load chamber.

To move and position the drag arms, said arms are selectively adjusted with controls in the control panel which the operator varies to position the drag arms. The bucket loader may also be simultaneously partially raised and angled to provide gravity assistance in emptying the bucket loader.

After the bucket load chamber is filled, the bucket loader is lowered and also filled to carry additional material. The operator then drives the loaded SLH vehicle to the dump site. At the dump site, the dumping means are activated by the control panel to raise and incline the bucket load chamber and bucket loader to empty their contents through the open front of the bucket loader.

In underground mining areas with contaminated air systems, the multipurpose vehicle adapted as an SLH vehicle may be operated by remote control. The SLH vehicle is adapted with revolving electronic viewing means, such as a remote control operated camera, capable of receiving and transmitting picture signals. Picture signals are then transmitted to the remote receiver viewing screen via a transmitter. A remote vehicle control system in communication with the control panel is then included to enable an operator to transmit signals to position and operate the vehicle from a distance.

To provide greater mobility and directional steering latitude, the SLH vehicle includes separate independent drive motors and steering means for each wheel. Either electrical or internal combustion engines drive motors may be utilized, depending upon fuel supply, availability, and cost.

Preferably the drive motors are present to run at their optimal efficiency levels. A variable speed transmission, such as that described in the variable speed transmission patent referred to above, is preferred for inclusion in each drive train to provide the desired speed and torque outputs to operate the drive wheels.

Various combinations of digging system components and drive system components may be utilized. As adapted, applicant's improved multipurpose vehicle provides an ergonometrically improved vehicle particularly suited for underground mining, digging, and hauling operations.

DESCRIPTION OF THE ILLUSTRATED EMBODIMENTS

Figure 1:
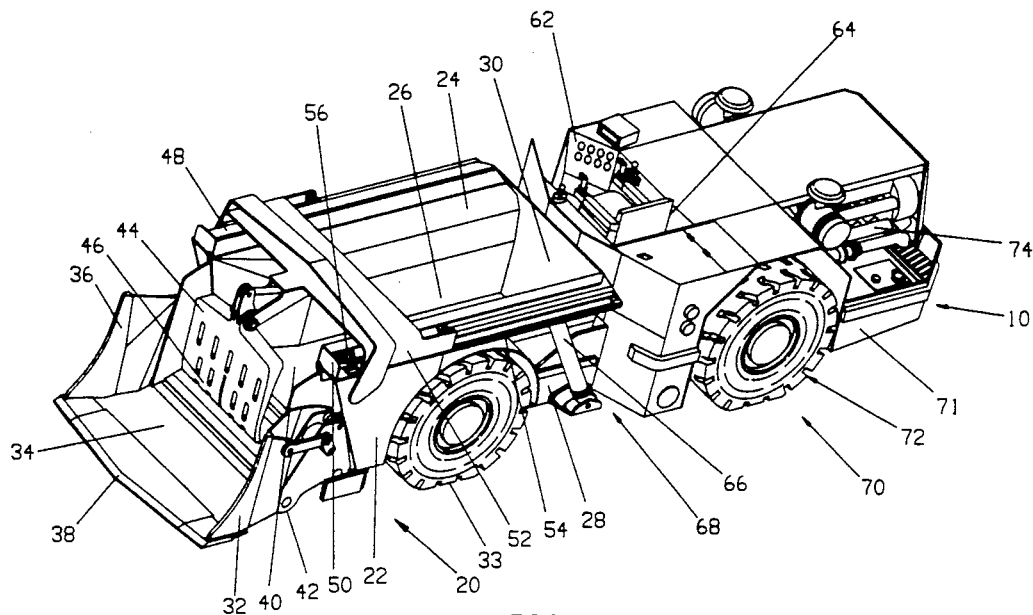
FIG. 1 illustrates a perspective view of a preferred embodiment of applicant's invention.

FIG. 1 illustrates a preferred embodiment of applicant's articulated self loading hauler system vehicle 10 utilizing the drag arm loading apparatus described below. Applicant's invention comprises an articulated three component multi-purpose vehicle for digging, hauling, and the like. It has a uni-body U-shaped digging system component 20 having a uni-body U-shaped digging frame 22 with an open topped bucket load chamber 24 having opposing sides 26, attached to a bed 28, and back 30 tiltably mounted to the frame 22. The bucket load chamber 24 defines an opening 32 leading into an interior load carrying space of the chamber 24. Wheel mounts (not shown) are attached to the opposing sides 26, and a plurality of wheels 33 are then independently suspended and rotatably attached to the wheel mounts.

Figure 5:
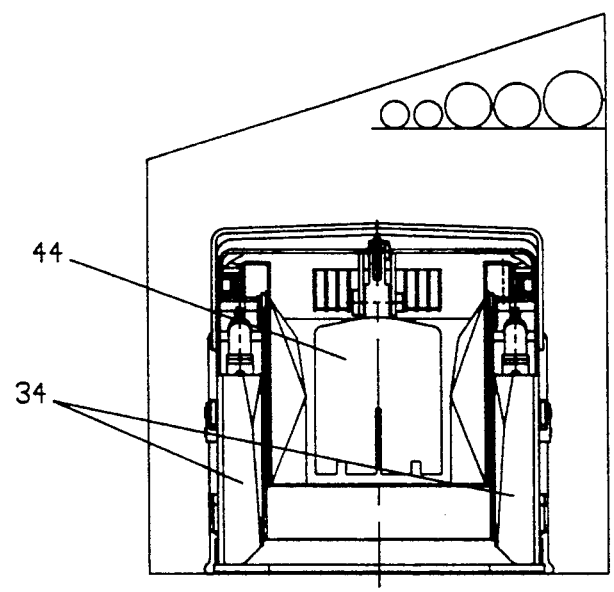
FIG. 5 is a perspective front view of a preferred bucket loader.

A bucket loader 32 having a bottom 34 and sides 36 defining an open top scoop with open ends 40 in communication with the bucket load chamber 24 is attached to the frame mount 42. The lip 38 of the bottom 34 is sharpened to dig and scoop earth, ore, and the like, into said bucket loader 32. As shown in the front view in FIG. 5, the bucket loader sides 32 define a narrowing opening from front to back to concentrate materials scooped up by the front end of the bucket loader 34 for discharge through its open rear end.

A drag arm 44 with teeth 46 to transfer the contents of the bucket loader 32 into the bucket load chamber 24 is attached to mounts 48 having first and second ends 50, 52 slideably mounted within longitudinal top grooves 54 along the top sides 26 of the load chamber 24. Hydraulic pistons 56 are then associated with the mounts 48 to selectively move said mounts 48 forward and rearward along the top grooves 54.

The drag arm 44 is attached to the mounts 48 to pivot as a lever. The teeth 46 are structured as a hooked drag when downwardly pivoted to drag earth or the like. A second pair of hydraulic pistons (not shown) has one end attached to the mounts 48, and the other end attached to the drag arm 44 to pivot the drag arm 44 upward and downward in response to the extension and contraction of the second hydraulic pistons. Control means 62 are mounted within the cab 64 to selectively pivot, extend and rearwardly pull the drag arm 44 to drag ore, rocks, and the like from the bucket loader 32 into the bucket load chamber 24.

A dump cylinder 66 is operably associated with the frame 22 and bucket load chamber 24 to selectively lift and tilt the bottom of the bucket load chamber 24 to unload the contents of said chamber 24 through the open end of the bucket loader 34 in one mode, and to lower and ready the bucket load chamber 24 for receipt of materials in the other mode.

A three point hinge connecting articulation system 68 component with a first hinge 68a is attached to the back of the digging frame 24.

A drive system component 70 having a drive frame 71 having a second hinge 68b is then hingedly attached to the first hinge 68a. The drive system component 70 preferably has a cab 64 mounted near the front of the frame, sized to accommodate an operator. A generator or battery (not shown) is operably associated with the control panel 62 and drag arm 44 and dump cylinder 66 to enable the operator to selectively load and unload the bucket loader.

Figure 4A:
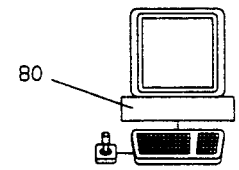
FIG. 4a is a perspective view of a remove receiver viewing screen and control panel system.
Figure 4:
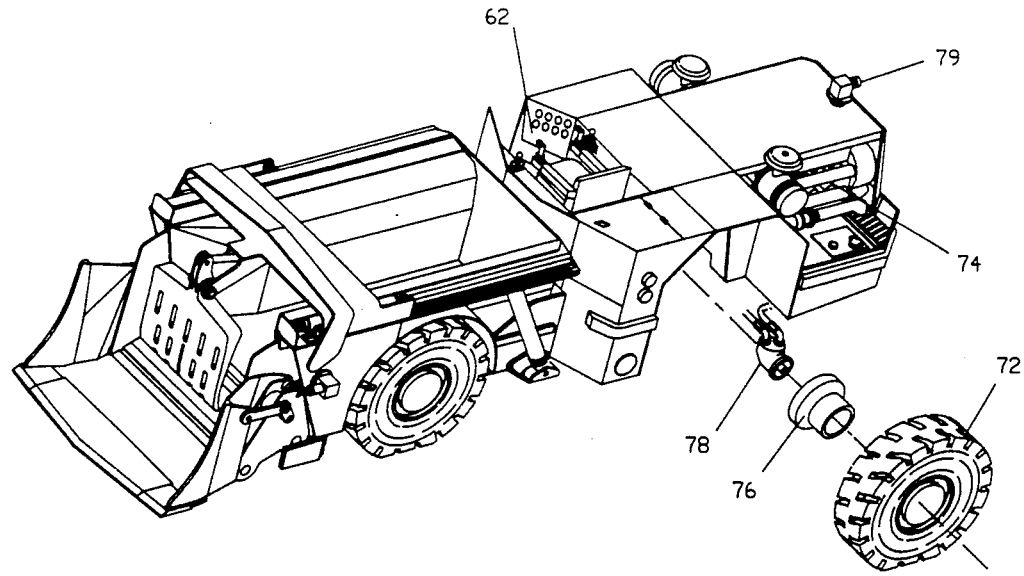
FIG. 4 is a perspective view of another preferred embodiment of applicant's invention.

An internal combustion engine 74 shown in FIG. 4 utilizing a hydrostatic wheel drive 76 separately drives the wheels via a wheel motor 78 associated with each wheel 72 to rotate said wheels 72 forward and backward. A power source, such as an internal combustion engine 74, is included to drive and operate the pivot wheels 72. The independent drive motor shown in FIG. 4. rotates each wheel 72 in a forward or rearward direction, giving the vehicle 10 wide directional steering latitude.

Figure 2:
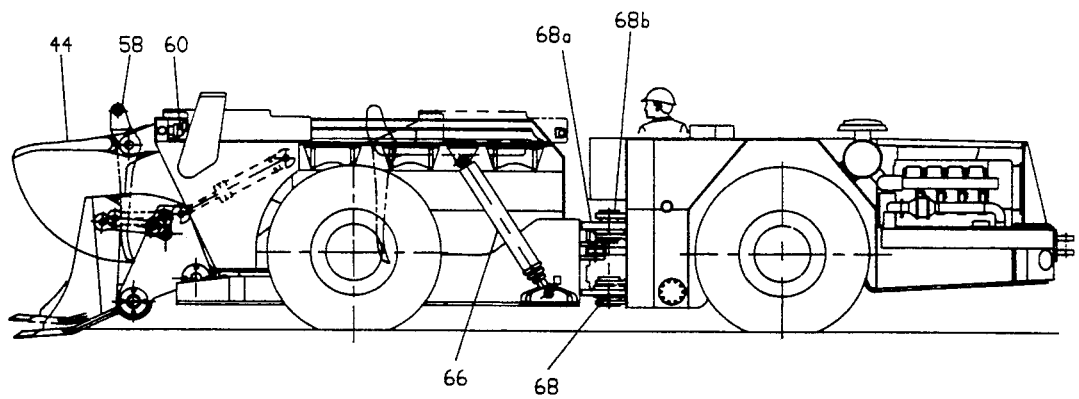
FIG. 2 a side view of the embodiment shown in FIG. 1.

FIG. 2 is a side view of the FIG. 1 articulated self loading hauler vehicle 20 showing the manner in which the drag arms 44 are moved forward and backward to assist in loading.

Figure 3:
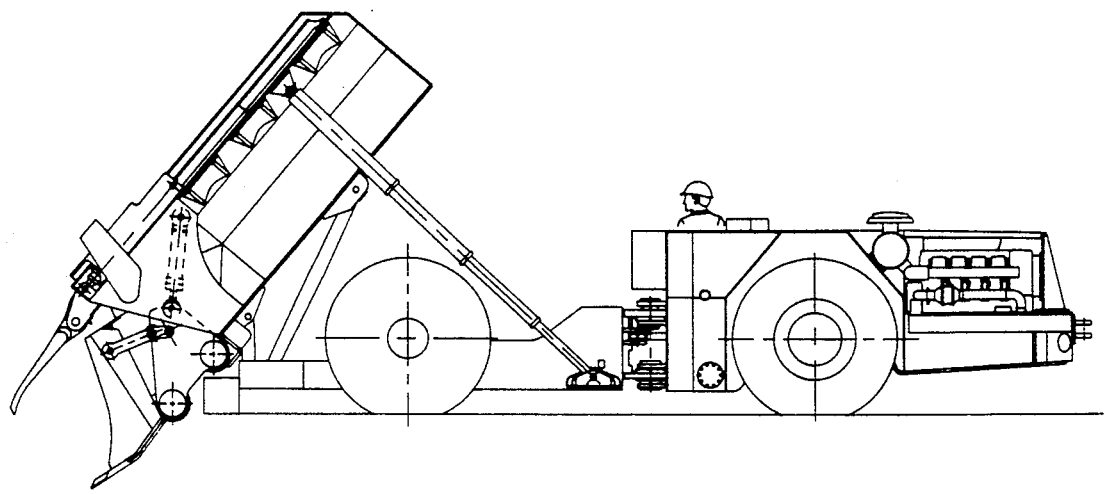
FIG. 3 is another side view of the embodiment shown in FIG. 1.

FIG. 3 is a side view of the FIG. 1 articulated self loading hauler (SLH) vehicle 10 showing the manner in which the load bucket chamber 24 is emptied.

FIG. 4 illustrates another preferred embodiment of an articulated SLH adapted for use in underground mining areas with contaminated air systems. The SLH is adapted with a revolving electronic remote control operated camera 79, capable of receiving and transmitting picture signals. Picture signals are then transmitted to the remote receiver viewing screen and control panel system shown in FIG. 4a via a transmitter (not shown). The remote vehicle control system 80 is in communication with the control panel 62 to enable an operator to transmit signals to position and operate the vehicle 10 from a distance.

The length of the self loading hauler system vehicle 10 is longer than its combined width and height. This enables the vehicle 10 to worked in confined working spaces in underground mines.

Figure 6:
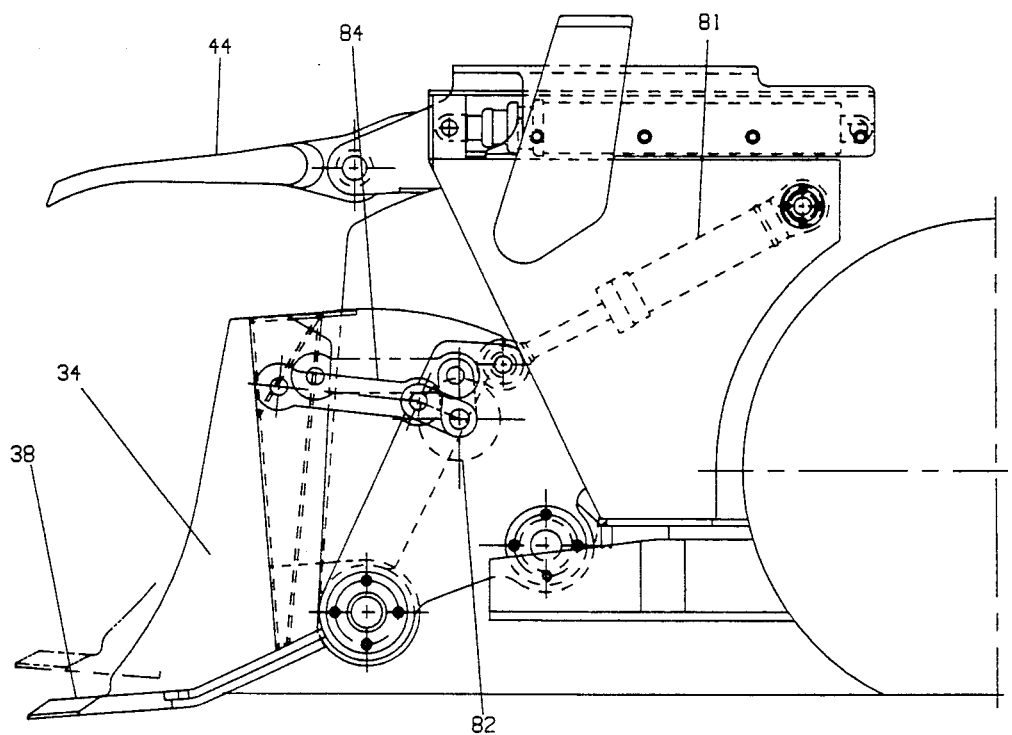
FIG. 6 is a side view of the front of a vibrating bucket loader.

FIG. 6 is an enlarged side view of the front end of the SLH bucket loader 34 taken from FIG. 2 showing the lip 38 being oscillated by the hydraulic actuator 82 through mechanical linkage 84. The lip 38 and frame 42 are positioned by cylinder 81.

Figure 7:
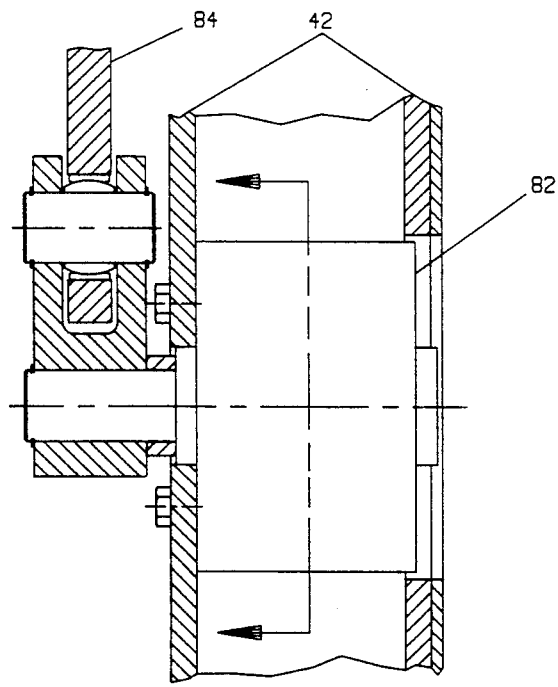
FIG. 7 is a partial cross section of a hydraulic rotary actuator and linkage shown in FIG. 6.

FIG. 7 is a partial cross section of the hydraulic rotary actuator 82 and linkage shown in FIG. 6. FIG. 7 shows how the actuator 82 is mounted to the frame (shown as number 42 in FIG. 1) and how the actuator shaft is attached to the linkage 84.

Figure 8:
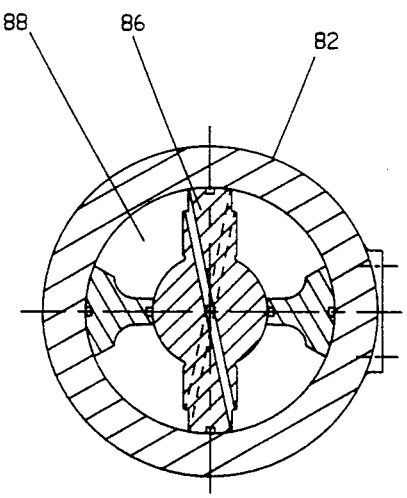
FIG. 8 is a section view of the hydraulic rotary actuator shown in FIG. 7.

FIG. 8 is a section view of FIG. 7 showing how a vane 86 is reciprocated back and forth as fluids are selectively directed into and out of chambers 88 in the housing of the actuator 82 to activate the mechanical linkage 84. The linkage 84 transmits the reciprocating action to vibrate the lip 38 to assist in loading the bucket loader 34.

A computer (not shown) controls valves directing hydraulic fluid into the respective chambers 88 of the rotary actuator 82 to control the amplitude and frequency of the reciprocating vane, which is translated via the linkage 84 to vibrate the bucket loader 34. The digging amplitude and frequency can be programmed to provide pre-set frequencies and amplitudes depending upon the digging resistance encountered, or can be manually set by the operator in the field. By utilizing the rotary actuator 82, a wide range of frequencies and amplitudes can be generated to dig and haul differing types soils, ores, and materials having varying densities and consistencies.

Although this specification has made reference to the specific embodiments, it is not intended to restrict the scope of the appended claims. The claims themselves recite those features deemed essential to the invention.

I claim:

1. An articulated multi-purpose vehicle for digging and hauling, comprising:
   a. a uni-body U-shaped digging system component having:
      i. a uni-body U-shaped digging frame with front, back, and opposing sides,
      ii. an open top bucket load chamber tiltably mounted to the frame, having opposing sides attached to a bed, with rear side ends connected by a back piece, and front ends defining an opening leading into an interior load carrying space of the chamber,
      iii. wheel mounts attached to the opposing sides,
      iv. a plurality of wheels independently suspended and rotatably attached to the wheel mounts,
      v. a bucket loader having a bottom and sides defining an open top scoop with open ends and the forward open end of the bottom sharpened to dig and scoop materials; said bucket loader hingedly attached to the frame with positioning structure to hold said bucket loader at a desired angle to load and unload material into said bucket loader;
      vi. transfer means to transfer the contents of the bucket loader into the bucket load chamber, having:
         (1) mounts having first and second ends slideably mounted within longitudinal top grooves along the top sides of the bucket load chamber
         (2) hydraulic pistons associated with the mounts to selectively move said mounts forward and rearward along the top grooves,
         (3) at least one drag arm with attachment means attached at one end of the drag arm to the mounts to pivot as a lever, and the other end of the drag arm structured as a hooked drag when downwardly pivoted to drag earth or the like,
         (4) second hydraulic pistons with one end attached to the mounts, and the other end attached to the drag arm attachment means to pivot the drag arm upward and downward in response to the extension and contraction of the second hydraulic pistons, and
         (5) control means to selectively pivot, extend and rearwardly pull the drag arm to drag ore and rocks and the like from the bucket loader into the bucket load chamber,
      vii. dumping means operably associated with the frame and bucket load chamber to selectively lift and tilt the bottom of the bucket load chamber to unload the contents of said chamber through the open end of the bucket loader in one mode, and to lower and ready the bucket load chamber for receipt of materials in another mode, and
   b. a three point hinged connecting articulation system having a first joint hingedly attached to the back of the digging frame; and
   c. a drive system component having
      i. a frame with front, back, and sides,
      ii. a cab mounted near the front of the frame, said cab sized to accommodate an operator, with at least one door opening for the operator to enter and exit the cab,
      iii. wheel mounts attached to the sides of the frame,
      iv. pivot means associated with the wheel mounts to pivot and turn each wheel mount in a desired direction,
      v. a plurality of wheels independently suspended and rotatably attached to the wheel mounts,
      vi. an engine mounted toward the rear of the frame and operably associated with the wheels to rotate said wheels forward or backward,
      vii. control means mounted within the cab and operably associated with the drive means and pivot means to selectively activate the drive means and pivot means to align and drive each wheel at the desired speed and direction,
      viii. a power source to selectively operate the pivot means, control means, tilting means, and bucket loader of the multi-purpose vehicle, and
      ix. a corresponding hinged articulation joint associated with the first articulation joint to articulately connect the loading system component to the driving system component.

2. An articulated multi-purpose vehicle according to claim 1, wherein the drive means comprises hydrostatic wheel drive.

3. An articulated multi-purpose vehicle according to claim 1, wherein the length of the vehicle is longer than its combined width and height.

4. An articulated multi-purpose vehicle according to claim 1, wherein the dumping means comprises a dump cylinder with one end attached to the digging frame and the other end attached to the bottom of the bucket load chamber to selectively raise and tilt the bucket load chamber to a dump position with the bucket loader functioning as an open tailgate when in a dump mode, and to selectively lower and level the bucket load chamber to a load position with the bucket loader functioning as a hauler, when positioned in a loading mode.

5. An articulated multi-purpose vehicle according to claim 1, including: rotatably mounted electronic viewing means capable of receiving and transmitting picture signals attached to the drive frame, and in electrical contact with a remote receiving viewing screen; and, a remote control in communication with the control means to enable an operator to position and operate the vehicle from a remote position.

6 An articulated multi-purpose vehicle according to claim 1, wherein the drive means and power source comprise at least one internal combustion engine having a fuel supply associated with each wheel.

7. An articulated multi-purpose vehicle according to claim 1, wherein the drive means and power source comprise at least one electric motor having an electric power source associated with each wheel.

8. An articulated multi-purpose vehicle according to claim 1, wherein the wheels of the driving and digging system components are independently suspended and rotatably attached to the wheel mounts, and including independent drive means associated with each drive wheel to rotate said wheels forward or backward.

9. An articulated multi-purpose vehicle according to claim 1, wherein the positioning structure is a positioning cylinder with one end attached to the frame and the other end to the bucket loader.

10. An articulated multi-purpose vehicle according to claim 1, including oscillation means associated with the bucket loader to provide low frequency oscillations to the bucket loader to assist said bucket loader in digging and scooping material.

11. An articulated multi-purpose vehicle according to claim 10 wherein the oscillation means vibrate the bottom of the bucket between ½ to 5 cycles per second.

12. An articulated multi-purpose vehicle according to claim 11, wherein the oscillating means raise and lower the digging edge of the bucket up approximately 3 inches and down approximately 3 inches.

13. An articulated multi-purpose vehicle according to claim 10, wherein the oscillating means comprises an hydraulically activated piston with one end attached to the frame and the other end attached to the bucket loader to oscillate the lip of said bucket loader up and down in response to the extension and contraction of the piston.

14. An articulated multi-purpose vehicle according to claim 10, wherein the oscillating means comprises an hydraulically activated rotary actuator attached to the frame having chambers separated by a vane to partially rotate in response to the direction of hydraulic fluid through respective chambers, said vane connected via linkage to the bucket loader to oscillate the lip of said bucket loader up and down at a desired amplitude and frequency.

15. An articulated multi-purpose vehicle according to claim 14, wherein a computer selectively directs hydraulic fluid into the respective chambers to rotate the vane in the desired amplitude and frequency.

* * * * *